United States Patent [19]
Hasegawa

[11] Patent Number: 5,825,513
[45] Date of Patent: Oct. 20, 1998

[54] DOCUMENT READING APPARATUS

[75] Inventor: Kazuhiko Hasegawa, Kawasaki, Japan

[73] Assignee: Canon Kabushiki Kaisha, Tokyo, Japan

[21] Appl. No.: 320,560

[22] Filed: Oct. 11, 1994

Related U.S. Application Data

[63] Continuation of Ser. No. 852,716, Mar. 17, 1992, abandoned.

[30] Foreign Application Priority Data

Mar. 20, 1991 [JP] Japan ................................. 3-080478

[51] Int. Cl.$^6$ ........................................ H04N 1/04
[52] U.S. Cl. ...................... 358/498; 358/474; 358/400; 355/308
[58] Field of Search ................... 358/400, 401, 358/474, 496, 498, 461; 355/308, 309, 311

[56] References Cited

U.S. PATENT DOCUMENTS 4,970,606  11/1990  Shima ........................... 358/496
5,194,898  3/1993  Costrop et al. .................. 358/474

FOREIGN PATENT DOCUMENTS 63-247881  10/1988  Japan ............................ 358/461

*Primary Examiner*—Thomas D. Lee
*Attorney, Agent, or Firm*—Fitzpatrick, Cella, Harper & Scinto

[57] ABSTRACT

A document reading apparatus includes: a feeding device for feeding documents along a document feed path; a reading device having a reading section for reading the documents being fed by the feeding device; a guide member opposed to the reading section of the reading device and adapted to guide the documents being fed by the feeding device; a biasing device for biasing the guide member toward the reading section of the reading device; and spacers for determining the distance between the guide member and the reading section of the reading device. The guide member, which is formed as a flexible body, is held at a position spaced away by a fixed distance from the reading section of the reading device by the biasing device.

29 Claims, 13 Drawing Sheets

DOCUMENT READING APPARATUS

This application is a continuation of application Ser. No. 07/852,716 filed Mar. 17, 1992, now abandoned.

BACKGROUND OF THE INVENTION

1. Field of the Invention

The present invention relates to a document reading apparatus for reading documents being fed at a reading position and, in particular, to a device for keeping a proper distance between the reading position and a document guide member opposed thereto in such a document reading apparatus.

2. Description of the Related Art

The related art of the present invention will be described with reference to FIGS. 12(a) and 12(b). FIG. 12(b) is a sectional view taken in the direction of the line A—A of FIG. 12(a).

Figure 12A:
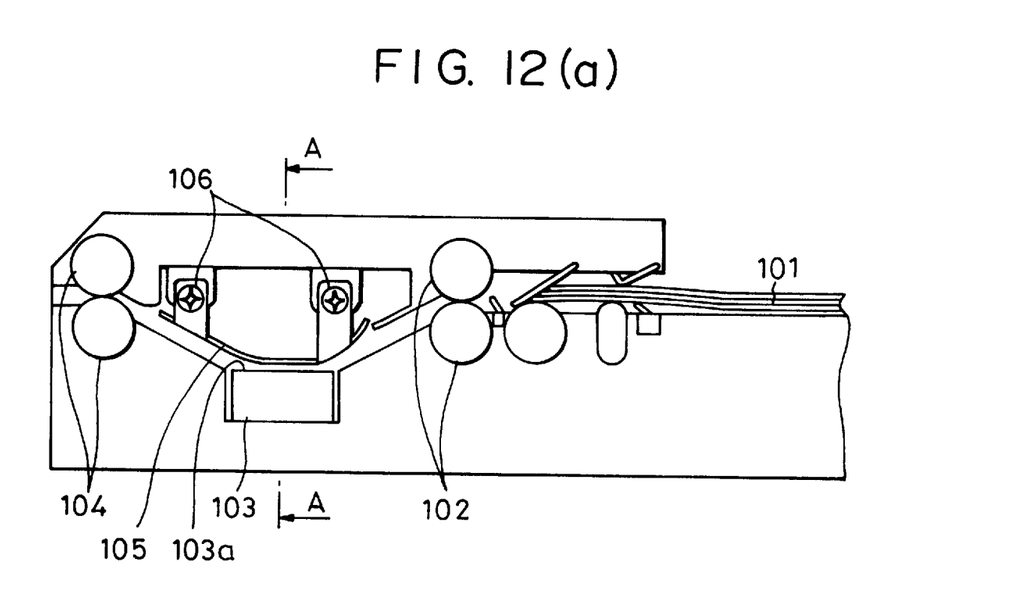
FIG. 12(a) is a sectional view of a document reading apparatus according to the related art of the present invention.
Figure 12B:
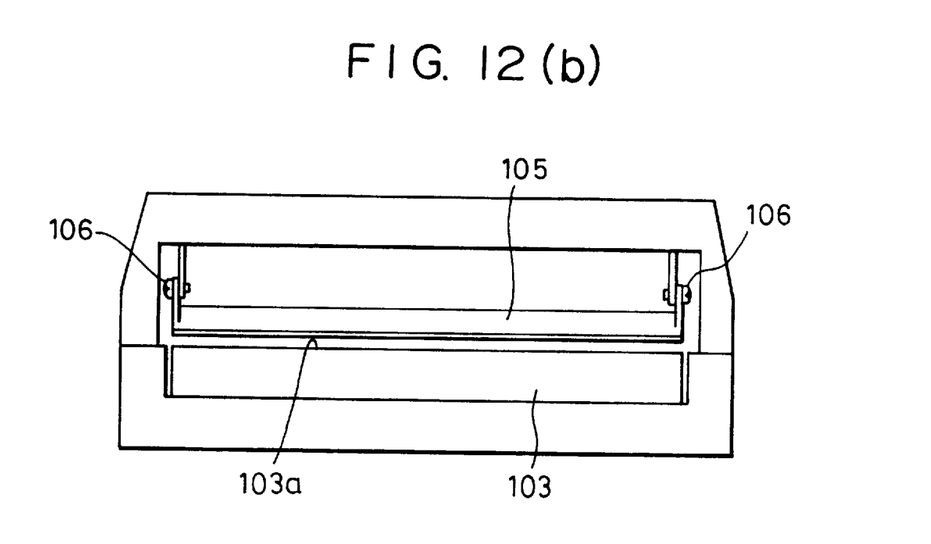
FIG. 12(b) is a sectional view taken along the line A—A of FIG. 12(a)

In FIG. 12(a), numeral 101 indicates a document, numeral 102 indicates feeding rollers for feeding the document 101, numeral 103 indicates a reading system for reading the document as it is fed, numeral 104 indicates discharge rollers for discharging the document 101, numeral 105 indicates a document guide plate which is white in color and adjusted by screws 106 so as to be spaced away from a reading surface 103a of the reading system 103 by a fixed distance.

In this apparatus, constructed as described above, the document 101 being fed is guided by the document guide plate 105 and read by the reading system 103.

Figure 13A:
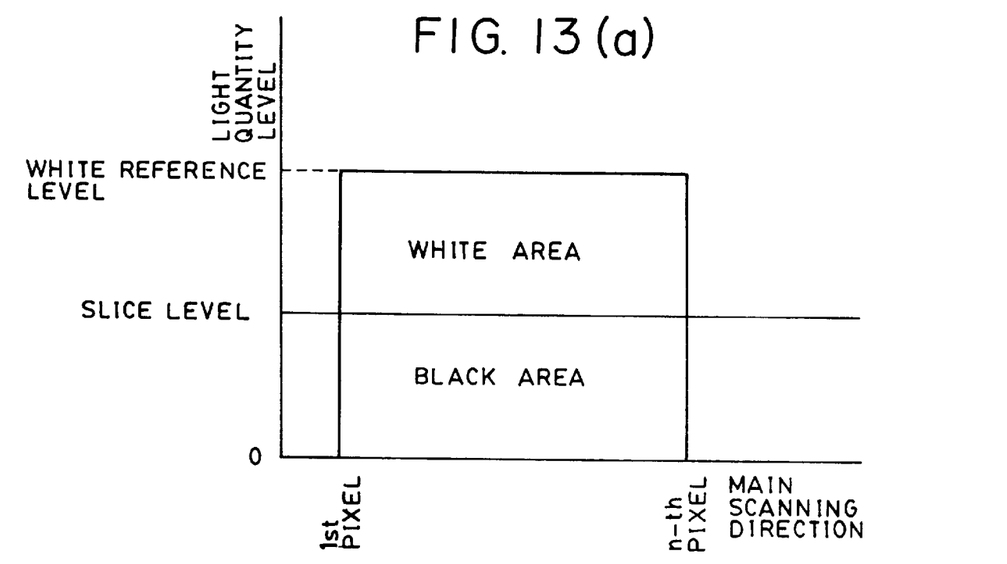
FIG. 13(a) is a diagram showing light-quantity levels in a monochrome image.
Figure 13B:
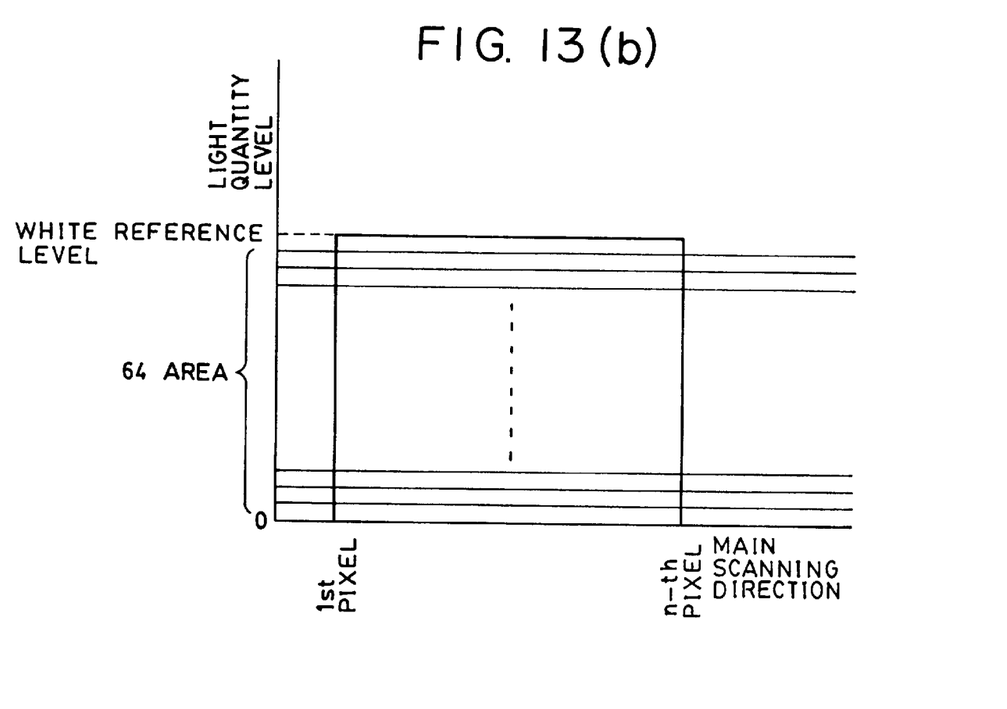
FIG. 13(b) is a diagram showing light-quantity levels in a medium-tone image.

Recently, a remarkable improvement has been attained in the image quality obtained by such document reading apparatuses. Even in a medium-tone expression, a tone reproduction level of as high as 64 has become standard. However, the higher the tone reproduction level is in a medium tone, the smaller the light-quantity-level interval between tone levels, making tone reproduction even more difficult. This will be explained with reference to FIGS. 13(a) and 13(b). FIG. 13(a) illustrates a light quantity distribution in the main scanning direction, for example, in one-line scanning of a monochrome image. In this case, a white color portion, which is to serve as a reference, is first read, and a white reference level is established after shading correction. Then, a certain slice level is established with respect to the white reference level. When the light quantity level at a given pixel is equal to or higher than the slice level, the corresponding image portion is regarded as white, and when the light quantity level at that pixel is below the slice level, the corresponding image portion is regarded as black. Thus, if the light quantity is reduced to some degree as a result of a leakage of light, the image quality is not affected due to the relatively wide white-level and black-level areas. However, this is not so in a medium-tone expression. In the case, for example, of a tone-reproduction level of 64, the white reference level is divided, as shown in FIG. 13(b), into sixty-four areas or intervals, and medium-tone expression for a given pixel is effected according to the area to which the light-quantity level of the pixel belongs. Thus, a slight fluctuation in light-quantity level as a result of a light leakage may cause the tone-reproduction level to deviate by several degrees. As a result, it may happen that a pure-white document is judged gray when read. Such light leakage can be caused by a slight change in the gap between the reading surface at the document reading position and the document guide member opposed thereto.

Figure 14:
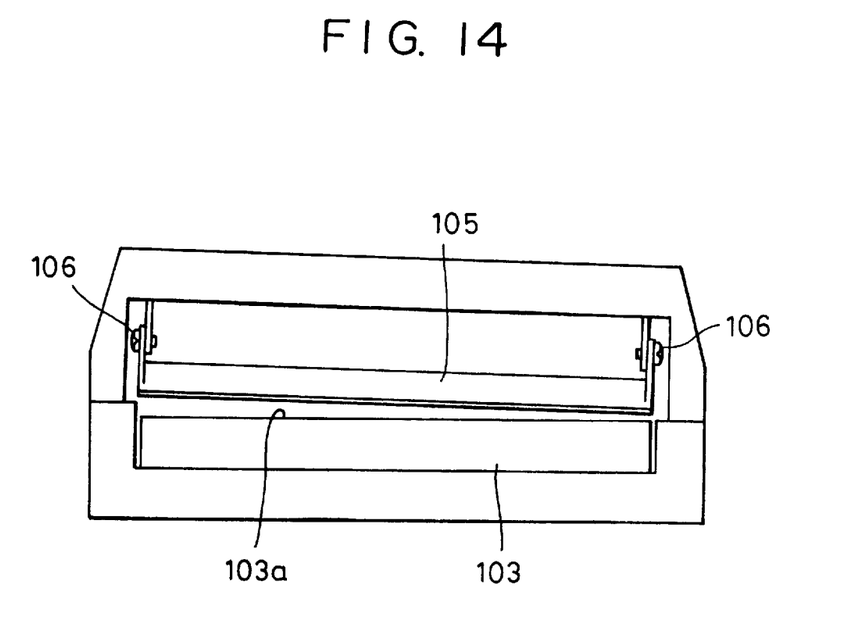
FIG. 14 is a diagram for illustrating the problem in the apparatus of FIG. 12.

The gap between the reading surface and the document guide member might be kept constant by using high-precision parts for these components. However, this would lead to an increase in production costs due to the need for a precision part-machining technique, the increased percentage of defective parts, etc. The introduction of an adjustment process into the apparatus assembling step would also lead to an increase in production costs because of the increased labor costs involved, the need for adjustment jigs, and the inevitable increase in production time per unit. Further, even when an optimum gap is realized by adjustment or the like, an apparatus as shown in FIG. 12 cannot be regarded as being perfectly free from the problem described above, for any deformation of its casing due to external forces would result in a corresponding change in the position of the document guide member. For example, the document guide member 105 may not be able to keep its parallel position with respect to the reading surface 103a, as shown in FIG. 14. In that case, the size of the gap at one end of the document guide member 105 will be different from that at the other end thereof, resulting in a defective reading or the like.

SUMMARY OF THE INVENTION

It is accordingly an object of the present invention to provide a document reading apparatus which is capable of reading a medium tone of a document correctly.

Another object of the present invention is to provide a document reading apparatus which is capable of feeding documents correctly across the document reading position.

Still another object of the present invention is to provide a document reading apparatus which has a reduced number of parts for positioning the document guide member.

Other objects, features and advantages of the invention will become more fully apparent from the following detailed description of the preferred embodiments, taken in connection with the accompanying drawings.

DETAILED DESCRIPTION OF THE PREFERRED EMBODIMENTS

Embodiments of the present invention will now be described with reference to the accompanying drawings.

Figure 1A:
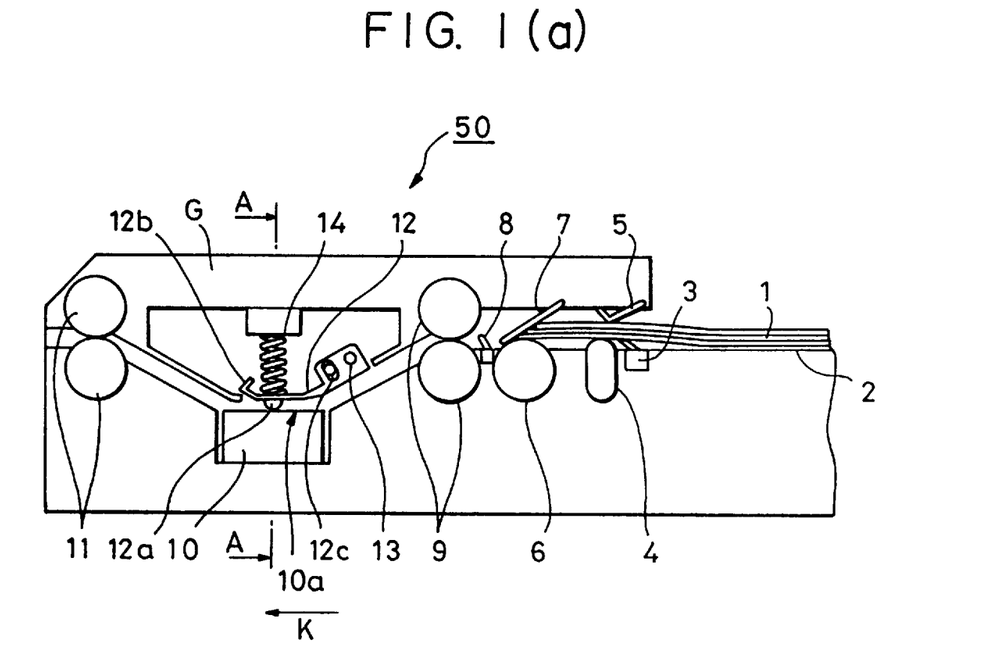
FIG. 1(a) is a sectional view of a document reading apparatus in accordance with a first embodiment of the present invention.
Figure 1B:
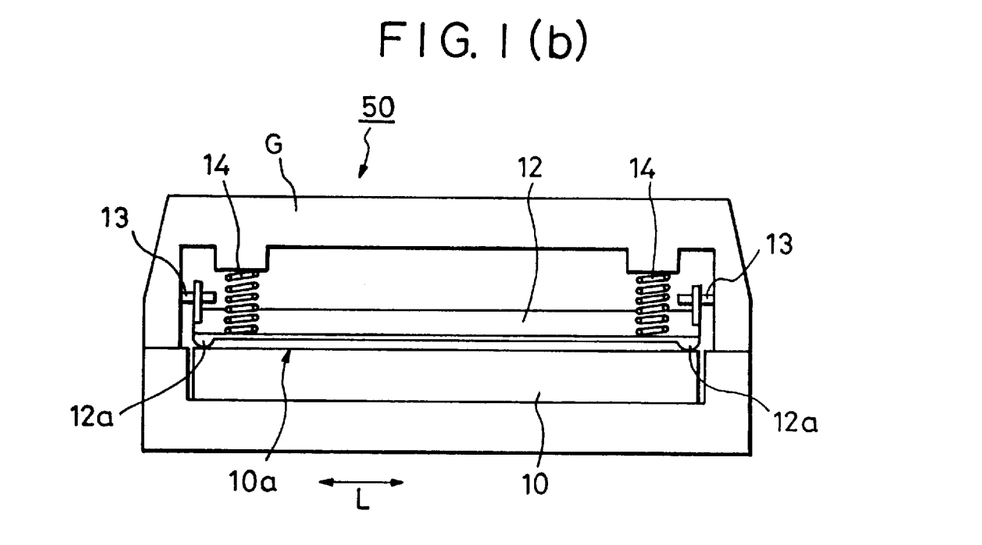
FIG. 1(b) is a sectional view taken along the line A—A of FIG. 1(a)

FIGS. 1(a) and 1(b) are sectional views of a document reading apparatus according to a first embodiment of the present invention. FIG. 1(b) is a sectional view taken along the line A—A of FIG. 1(b). In the drawings, numeral 1 indicates a document consisting of a plurality of sheets; numeral 2 indicates a tray on which the document 1 is placed; numeral 3 indicates a document sensor for checking whether the document 1 is on the tray 2; numeral 4 indicates a preliminary feeding roller for feeding the document 1 into the apparatus; numeral 5 indicates a document presser foot for pressing the document 1 against the preliminary feeding roller 4; numerals 6 and 7 indicate a separation roller and a friction member, respectively, which separate the plurality of sheets constituting the document 1 one by one; numeral 8 indicates a leading edge sensor for detecting the leading edge of each separated sheet of the document 1; numeral 9 indicates feeding rollers for transferring the document 1 to a document reading system 10; numeral 11 indicates discharge rollers for discharging the document 1; and numeral 12 indicates a document guide member which is opposed to a reading surface 10a for the purpose of guiding the document being fed by the feeding rollers 9 and which is rotatable on axles 13 provided on an apparatus body 50. The document guide member 12 is made of a flexible material (for example, a plastic sheet) which is easily deflected by external forces. The front end (with respect to the document feed path indicated by the arrow K) of the document guide member 12 is formed as a bent section 12b. The document guide member 12 has protrusions 12a, which are in contact with the reading surface 10a, at positions where they do not hinder the passage of the document 1. The reading surface 10a constitutes the reading section of the reading system 10. The protrusions 12a are arranged perpendicularly to the feeding path of the document, on either end of the reading line of the reading system 10. These protrusions serve as spacers for determining the distance between the reading surface 10a and the lower surface of the document guide member 12.

The reading system has a light source and sensors, such as photoelectric conversion devices. The document is illuminated by the light source, and the reflected light is received by the sensors, thereby reading the document. Numeral 14 indicates a biasing means consisting of springs for applying pressure to the document guide member 12 so as to bring the protrusions 12a of the document guide member 12 into contact with the reading surface 10a of the reading system 10. These springs are positioned on either end in the longitudinal direction of the document guide member 12.

That surface of the document guide member 12 facing the reading surface 10a is white. It serves both as a white reference level and as a white background for documents.

The document guide member 12, the biasing means 14 and the axles 13 are supported by a support means G which can be opened and closed with respect to the apparatus body. The range of rotation of the document guide member 12 is restricted by elongated holes 12c, so that the document guide member 12 does not project from part G due to the biasing of spring 14 when the support means G is opened.

Figure 2:
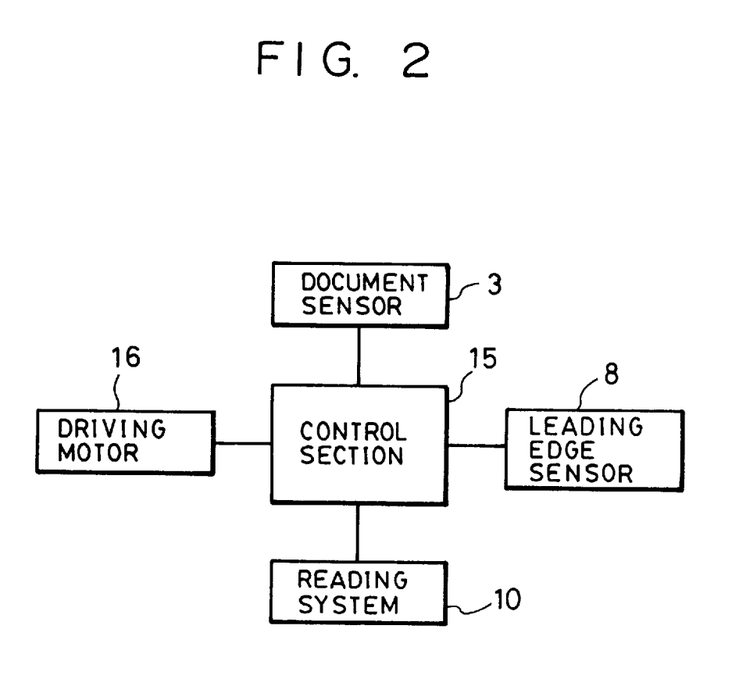
FIG. 2 is a block diagram showing a main control system in the apparatus of FIG. 1.

FIG. 2 is a block diagram of the document reading apparatus of this embodiment. Reference numeral 15 indicates a control section of the apparatus, which controls the document sensor 3, the leading edge sensor 8, the reading system 10, and a driving motor 16 (not shown in FIG. 1) for driving the feeding system.

Figure 3:
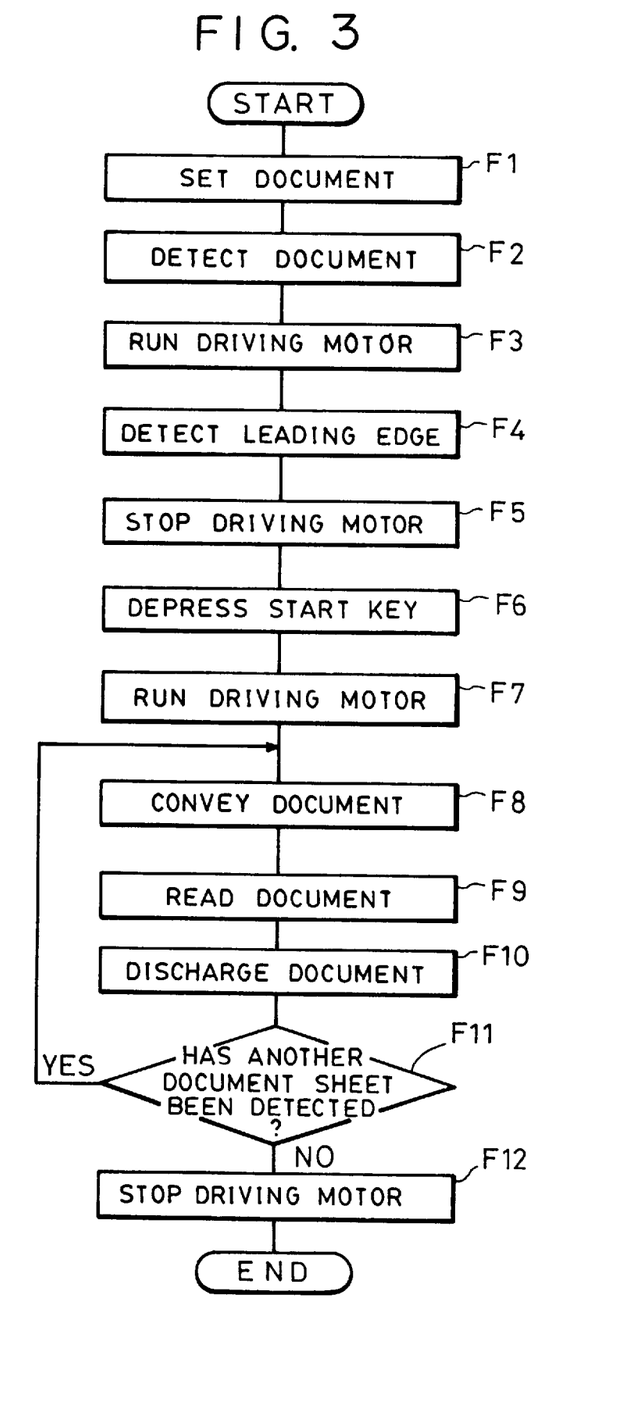
FIG. 3 is a flowchart illustrating the operation of the apparatus of FIG. 1.

Next, the operation of the apparatus of this embodiment will be described with reference to the flowchart of FIG. 3. The operation consists of the following steps Step F1: The user sets the document 1 on the tray 2;

Step F2: The document sensor 3 detects the document 1 and supplies a signal to the control section 15;

Step F3: In response to the signal from the control section 15, the driving motor 16 is run to separate a sheet from the (generally multi-sheet) document 1;

Step F4: The leading edge sensor 8 detects the leading edge of the separated sheet of the document 1 and supplies a signal to the control section 15;

Step F5: In response to the signal from the control section 15, the driving motor 16 is stopped;

Step F6: The user specifies the density and resolution of the image to be obtained and depresses a start key;

Step F7: The driving motor 16 is run to transmit a driving force to the feeding system;

Step F8: The feeding rollers 9 transfer the separated sheet of the document 1 to the reading system 10;

Step F9: The transferred sheet of the document 1 is positioned by the document guide member 12, and the image information of the sheet is read by the reading system 10;

Step F10: The sheet is discharged by the discharge rollers 11 after being read;

Step F11: If, when the reading is completed, another sheet of the document 1 has been detected by the document sensor 3, the procedure returns to step F8 so as to perform reading; when the document 1 has been read entirely, the procedure advances to step F12; and Step F12: The driving motor 16 stops, thereby ending the entire reading operation.

Figure 4:
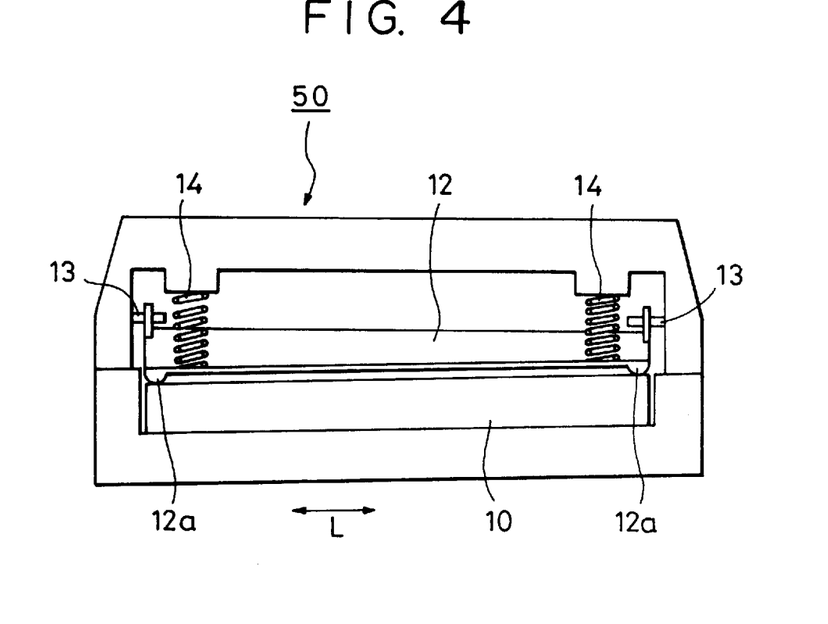
FIG. 4 is a diagram showing the apparatus of FIG. 1 deformed.

This embodiment provides the following advantage: If the apparatus body 50 is deformed as shown in FIG. 4, the axles 13 will not be able to be kept parallel to the reading surface 10a. Even in this case, however, the protrusions 12a are held in contact with the reading surface 10a by virtue of the pressure of the springs 14, applied to the end portions of the document guide member 12, so as to make the document guide member 12, which is formed of a flexible material, flex within its limit of elasticity. Accordingly, the lower surface of the document guide member 12 can be kept parallel to the reading surface 10a.

Figure 5:
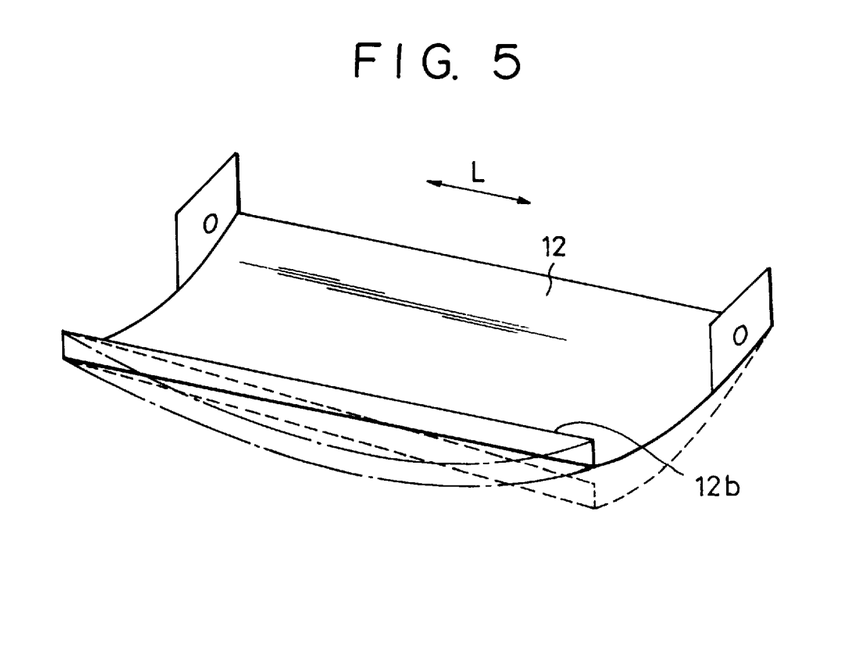
FIG. 5 is a diagram illustrating a deflection of a document guide member of the apparatus of FIG. 1.

Further, by virtue of its bent section 12b, the document guide member 12 of this embodiment has rigidity in the longitudinal direction thereof, indicated by the arrow L, shown in FIGS. 1(b), 4 and 5. Therefore, there is no danger of the document guide member 12 being deflected in such a manner as to reduce the gap between it and the reading surface 10a even when the springs 14 for applying pressure are situated on the inner side with respect to the protrusions 12a, as in the case of FIG. 1(b). Accordingly, the gap between the lower surface of the document guide member 12 and the reading surface 10a can always be kept uniform. That is, as shown in FIG. 5, the document guide member 12 is rigid and free from deflection in the longitudinal direction L (as indicated by the chain line in the drawing), whereas it can be easily deflected along the document feed path as indicated by the arrow K, shown in FIG. 1(a) (the broken line).

In this embodiment, the pressure of the springs 14 may be applied to the protrusions 12a from directly above. In that case, the document guide member 12 is protected from deflection in the direction perpendicular to the length of the axles 13 even when it has no bent section 12b, thus making it possible to keep the gap uniform.

Although in this embodiment the protrusions 12a are held in contact with the reading surface 10a by means of the springs 14, it is also possible to keep them in contact with the reading surface by means of a weight provided on the document guide member 12.

Next, a second embodiment of the present invention will be described.

Figure 6A:
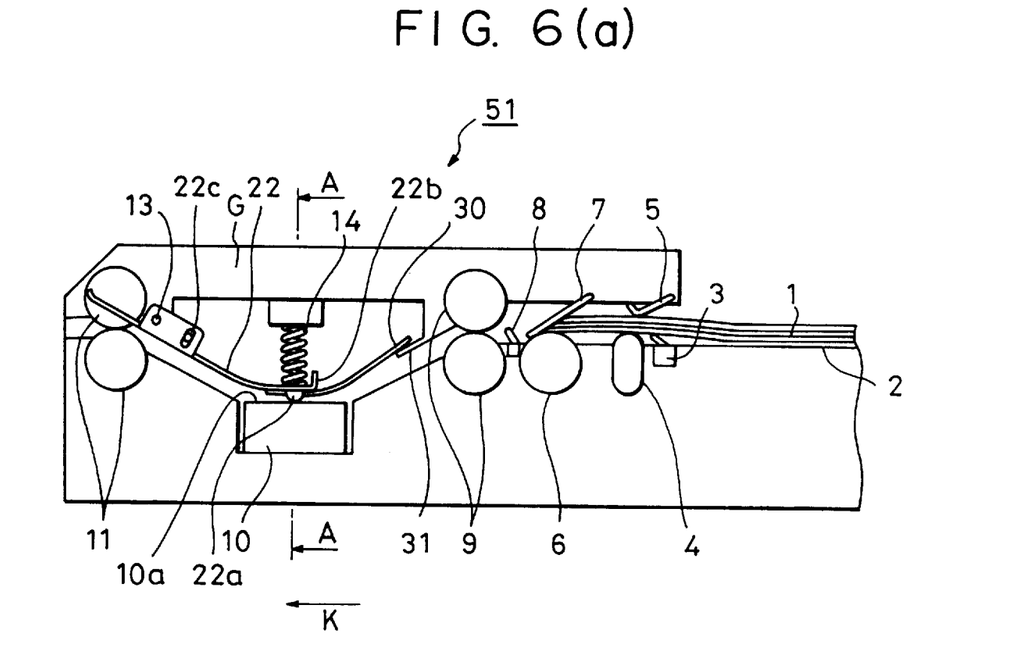
FIG. 6(a) is a sectional view of a document reading apparatus in accordance with a second embodiment of the present invention.
Figure 6B:
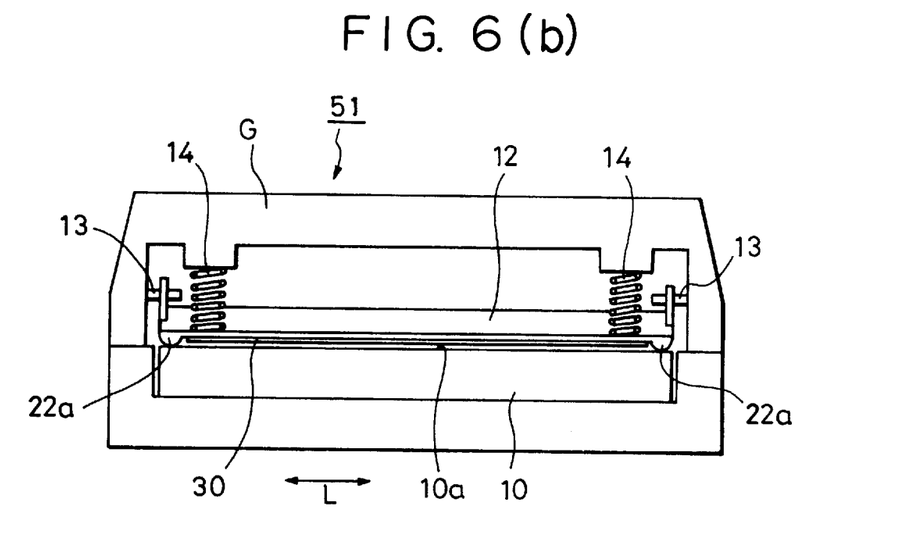
FIG. 6(b) is a sectional view taken along the line A—A of FIG. 6(a)

FIGS. 6(a) and 6(b) are sectional views of a document reading apparatus in accordance with a second embodiment of the present invention. FIG. 6(b) is a sectional view taken along the line A—A of FIG. 6(a).

The basic construction of the second embodiment is the same as that of the first one, and the components common to them are referred to by the same reference numerals. In the following, only the distinguishing features of the second embodiment will be described.

In FIGS. 6(a) and 6(b), reference numeral 30 indicates a first document guide member for guiding documents being fed. The first document guide member 30 is provided on the upstream side of the document feed path with respect to the reading system 10. Further, the first document guide member 30 consists of a thin and flexible sheet member (for example, a plastic sheet) whose surface facing the reading surface 10a is white. Reference numeral 31 indicates an upstream-side guide section for guiding the document 1 to the first document guide member 30. The first document guide member 30 is elastically in contact with the inner surface of the upstream-side guide section 31, so that there is no gap or difference in level between the first document guide member 30 and the upstream-side guide section 31 which would hinder the feeding of the document 1. That is, the two components together form a smooth and continuous document feeding path.

Reference numeral 22 indicates a second document guide member for guiding documents being fed. The second document guide member 22 is provided on the downstream side of the document feed path with respect to the reading system 10. The second document guide member 22 is rotatable on axles 13 which are provided on the apparatus body 51, and has two protrusions 22a situated substantially in the reading line. The protrusions 22a are in contact with the reading surface 10a of the reading system 10 at positions where they do not hinder the passage of the document 1. The second document guide member 22 is formed of a flexible material and its front end portion (as seen in the document feed direction K), at a position substantially above the reading line, is formed as a bent section 22b. Further, springs 14 for biasing the second guide member 22 toward the reading surface 10a are provided in the vicinity of the two protrusions 22a. The axles 13, the springs 14 and the protrusions 22a are supported by a support means G. Due to this construction, the second document guide member 22 has rigidity along a longitudinal line (indicated by the arrow L), which is substantially above the reading line. Accordingly, as shown in FIG. 5, that section of the guide member 22 above the reading line is free from deflection, whereas the remaining section of the member is easily made to flex in the direction of the biasing force of the springs 14.

The first document guide member 30 is adhered to the surface of the second document guide member 22 facing the reading system 10, so that the two document guide members overlap above the reading line of the reading system 10.

Thus, in this embodiment, the first document guide member 30, which consists of a thin and flexible sheet member, is made to flex following any deflection of the second guide member 22. Further, since the first document guide member 30 is elastically in contact with the inner surface of the upstream-side guide section 31, there is no gap or difference in level between the first document guide member 30 and the upstream-side guide section 31 which would hinder the feeding of the document 1. In addition, since the first document guide member 30 is attached to the lower surface of the second document guide member 22, it is possible to feed the document accurately onto the reading surface 10a of the reading system 10.

In this embodiment, the axles 13, which serve as connecting members, are arranged in the vicinity of the discharge rollers 11, and the second document guide member 22 extends downstream beyond the discharge rollers 11, so that the document can be accurately guided to the discharge rollers even if the second document guide member 22 rotates to some extent.

Thus, in this embodiment, the document feeding path extending from the feeding rollers 9 to the discharge rollers 11 can always be kept smooth and continuous even when the apparatus body 51 suffers deformation. Accordingly, it is possible to feed documents smoothly.

Further, in this embodiment, the document guide member consists of two guide members, 30 and 22, respectively arranged before and after the reading system 10. This arrangement is advantageous in that it has a document guide member whose front end portion is bent at a position nearer to the reading section (the reading line) than in the case of the first embodiment. Accordingly, the second document guide member 22 can be made even more rigid close to the reading line, along the longitudinal line L (FIG. 5). If the apparatus body 51 is deformed, and the axles 13 and the reading surface 10a cannot be kept parallel any longer, the second document guide member 22 flexes by virtue of the springs 14 within its limit of elasticity, and the protrusions 22a abut the reading surface 10a. Due to the rigidity of the second document guide member 22 along the longitudinal line L near the reading line, the second document guide member 22 and the reading surface 10a can always be kept parallel to each other, thereby keeping a uniform gap between the two. Accordingly, the gap between the first document guide member 30 and the reading surface 10a can also be kept uniform.

Where the springs apply a biasing force to those portions of the second document guide member corresponding to the protrusions, the first and second document guide members may be formed as one integral part. Further, it is possible for the axles 13 to serve also as the rotating shaft of the discharge rollers 11.

Figure 7A:
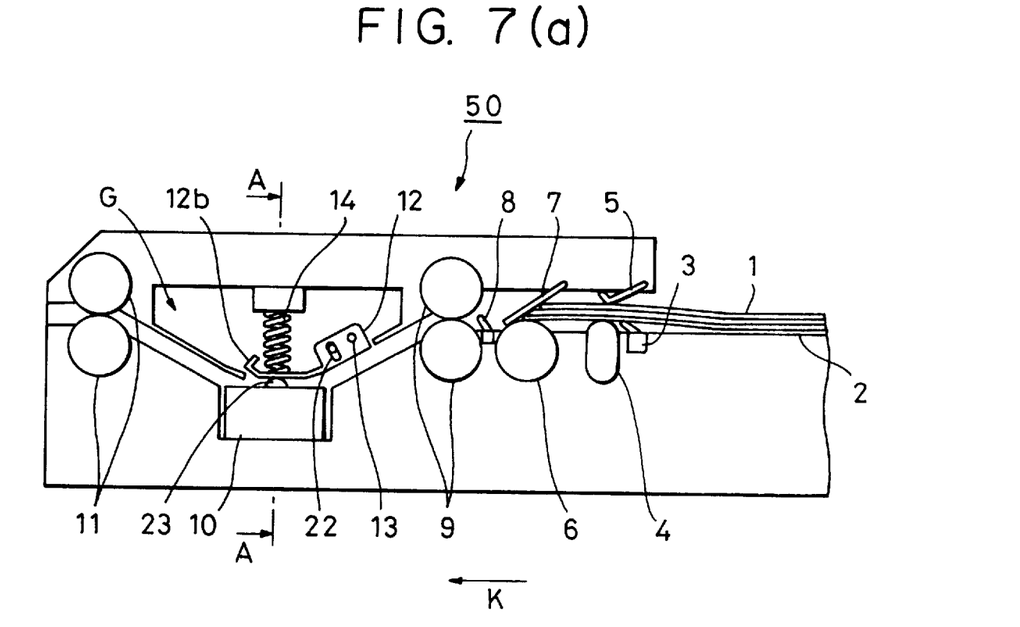
FIG. 7(a) is a diagram showing a modification of the apparatus of FIG. 1.
Figure 7B:
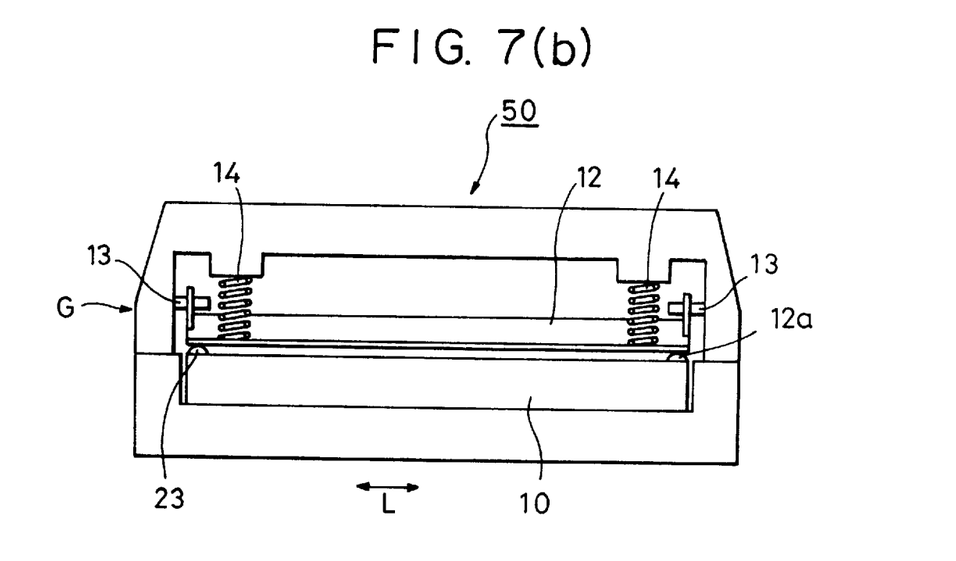
FIG. 7(b) is a sectional view taken along the line A—A of FIG. 7(a)

While in the above first and second embodiments the protrusions, which serve as spacers, are provided on the document guide member, it is also possible for these protrusions to be provided on the reading surface, as in the example shown in FIGS. 7(a) and 7(b). In this example, protrusions 23 are provided on the reading surface 10a of the reading system. This arrangement provides the same effect as the above-described embodiments.

Next, a third embodiment of the present invention will be described.

Figure 8:
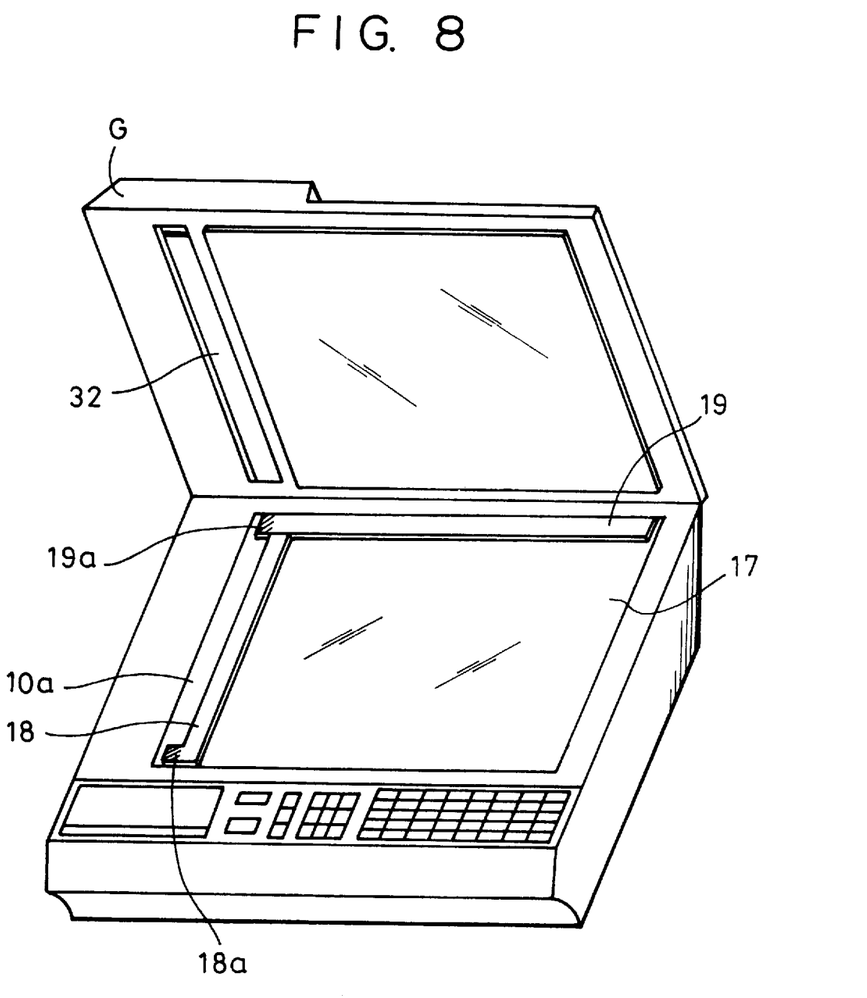
FIG. 8 is a perspective view of a document reading apparatus in accordance with a third embodiment of the present invention.
Figure 9A:
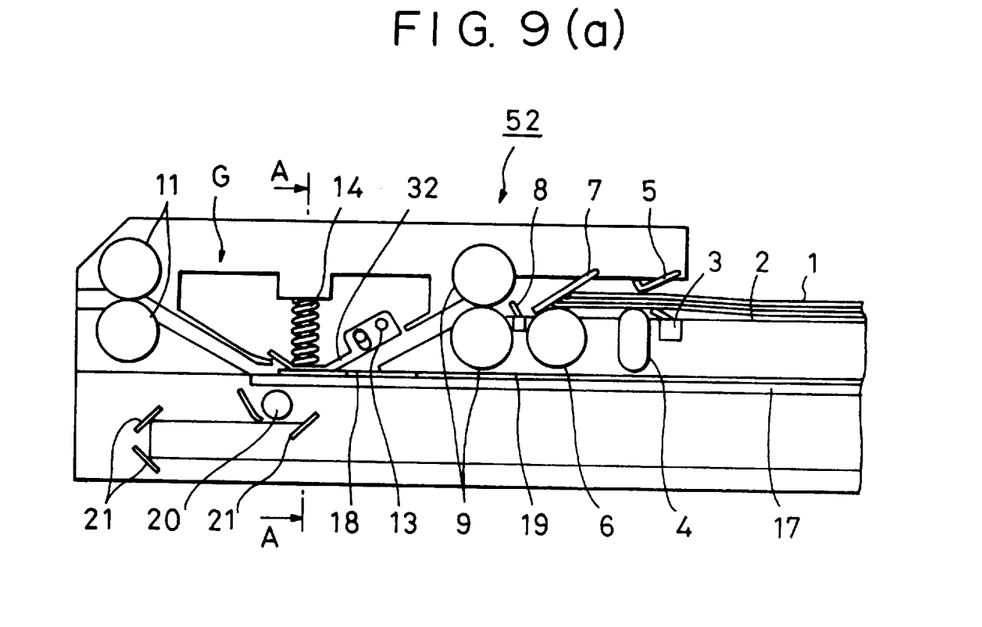
FIG. 9(a) is a sectional view of the apparatus of FIG. 8.
Figure 9B:
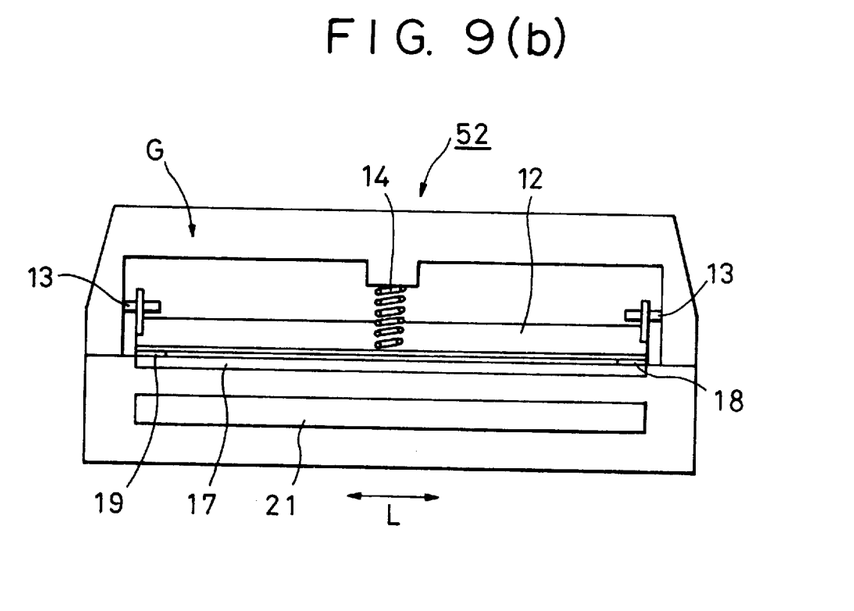
FIG. 9(b) is a sectional view taken along the line A—A of FIG. 9(a)

FIGS. 8 and 9 show a document reading apparatus in accordance with the third embodiment. This apparatus is capable of reading documents in the form of books (hereinafter referred to as "book documents"). Numeral 17 indicates a glass plate on which a book is placed; numeral 18 indicates a longitudinal document positioner for positioning a book document longitudinally (as seen in FIG. 8); numeral 19 indicates a transverse document positioner for positioning the book document transversely (as seen in FIG. 8); numeral 20 indicates a fluorescent lamp for illuminating the surface of the document; and numeral 21 indicates a mirror system for reflecting image information onto photoelectric conversion devices (not shown) which convert optical information to electric signals. Numeral 32 indicates a rigid document guide member for guiding documents. A housing G which includes the document guide member 32, springs 14, etc., is provided on the apparatus body in such manner that it can be opened and closed around an axis parallel to the direction in which documents are fed.

In this embodiment, a sheet document 1 is read in the apparatus section on the left-hand side of the longitudinal document positioner 18 (as seen in FIG. 9(a)). When a book document is read, the section on the right-hand side of the longitudinal document positioner 18 is scanned by the fluorescent lamp 20 and the mirror 21. When reading a sheet document, the protrusion 18a of the longitudinal document positioner 18, and the protrusion 19a of the transverse document positioner 19 (these protrusions are indicated by the hatched portions in FIG. 8) are brought into contact with the document guide member 32, thereby ensuring an appropriate gap between the reading surface 10a and the document guide member 32.

Thus, in this embodiment, a proper gap is maintained between the reading surface and the document guide member by utilizing document positioners, so that there is no need to provide separate spacers, thus making it possible to reduce the number of parts.

Figure 10A:
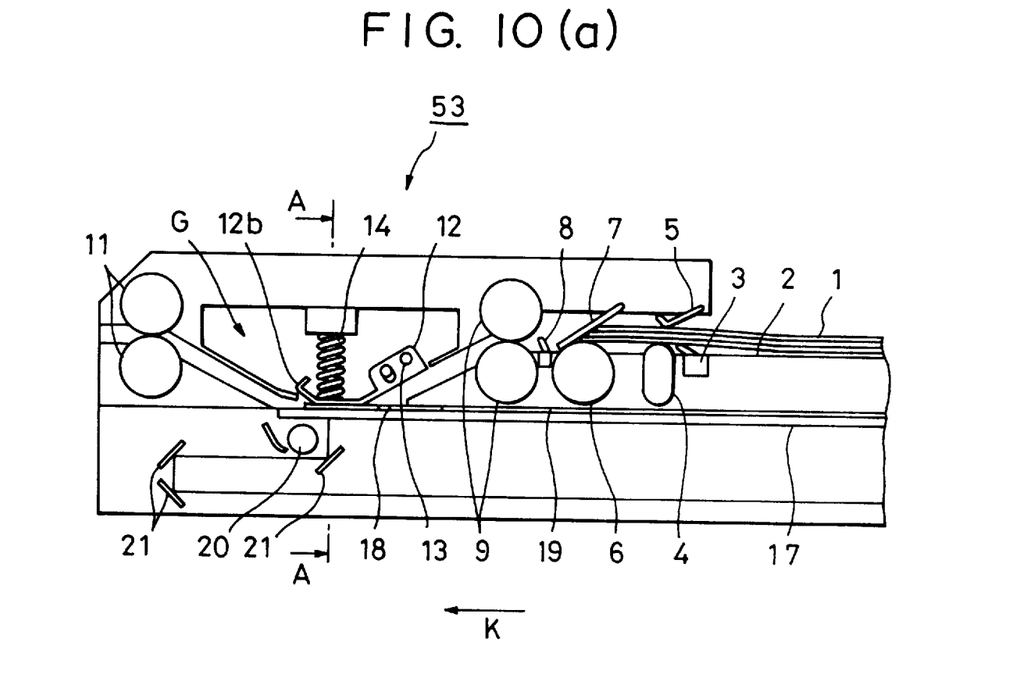
FIG. 10(a) is a diagram showing the document guide member of FIG. 1 as applied to the apparatus of FIG. 9.
Figure 10B:
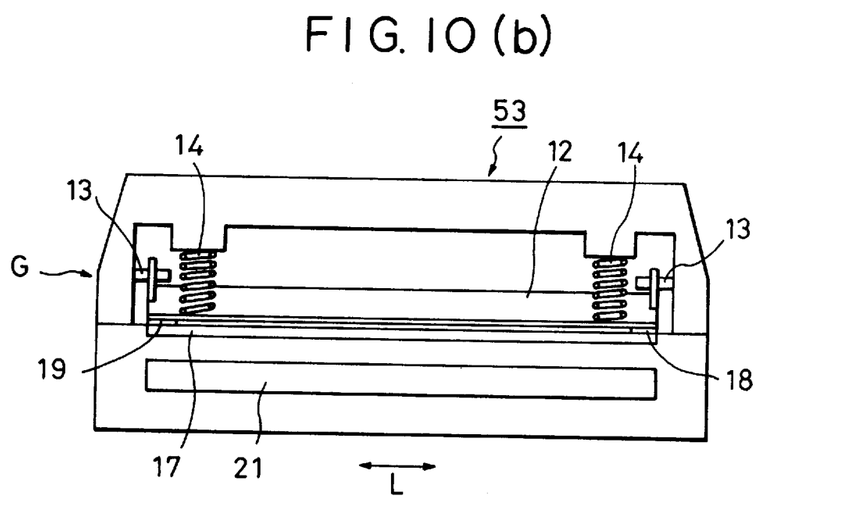
FIG. 10(b) is a sectional view taken along the line A—A of FIG. 10(a)
Figure 11A:
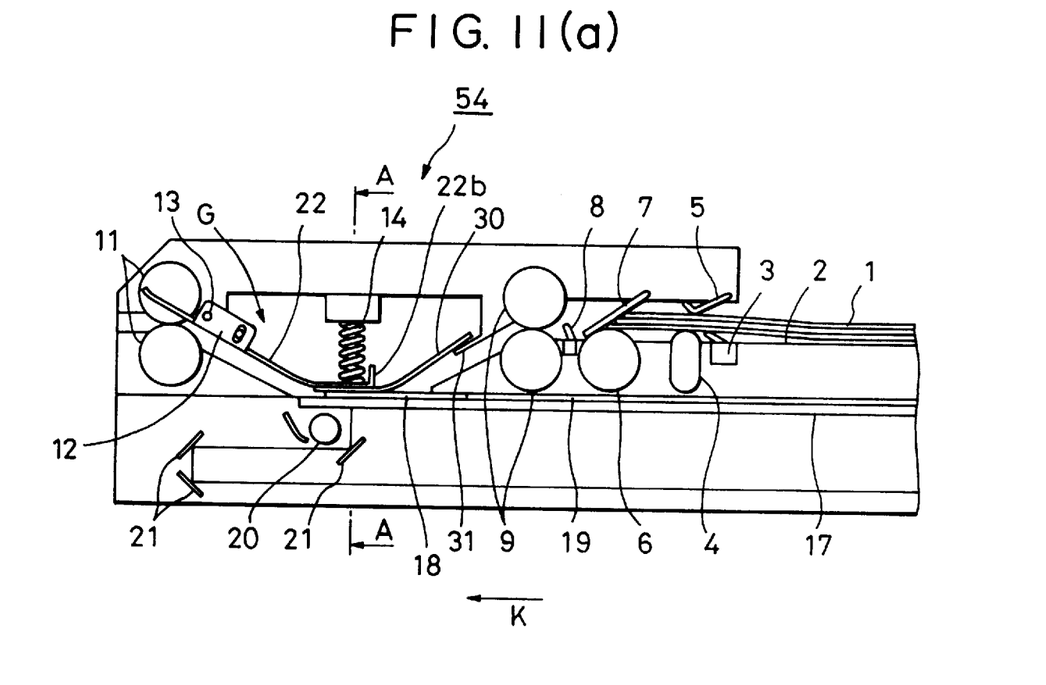
FIG. 11(a) is a diagram showing the document guide member of FIG. 8 as applied to the apparatus of FIG. 9.
Figure 11B:
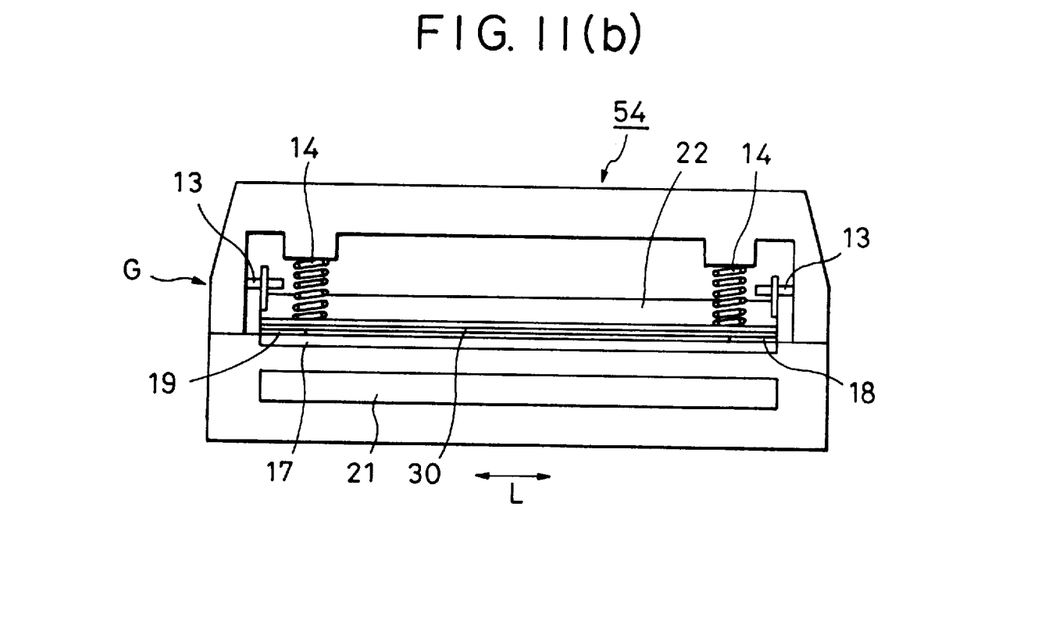
FIG. 11(b) is a sectional view taken along the line A—A of FIG. 11(a)

FIGS. 10(a) and 10(b) show the apparatus of the third embodiment with the document guide member of the first embodiment applied thereto. FIGS. 11(a) and 11(b) show the apparatus of the third embodiment with the document guide member of the second embodiment applied thereto. These arrangements provide the same effect as the third embodiment.

While the present invention has been described with reference to specific embodiments thereof, the present invention is not restricted to these embodiments. Various modifications are possible without departing from the spirit and scope of the present invention.

What is claimed is:

1. A document reading apparatus comprising:

feeding means for feeding documents along a document feed path;

reading means having a reading section for reading the documents being fed by said feeding means;

a sheet member opposed to the reading section, said sheet member extending from a first location, upstream of the reading section, to a second location, downstream of the reading section;

a plurality of spacers for maintaining a predetermined gap between said sheet member and the reading section of said reading means, said spacers being held against the reading section; and biasing means for biasing said sheet member toward the reading section of said reading means, said sheet member having an end portion downstream of the reading section, said end portion being movable about a center of movement which is upstream of the reading section.

2. A document reading apparatus according to claim 1, wherein said spacers are arranged perpendicularly to the document feed path, at either of two ends of said reading means.

3. A document reading apparatus according to claim 2, wherein said spacers are on a reading line of said reading means.

4. A document reading apparatus according to claim 1, wherein said spacers are provided on said sheet member.

5. A document reading apparatus according to claim 1, wherein said spacers are provided on said reading means.

6. A document reading apparatus according to claim 1, wherein said biasing means applies a biasing force to said sheet member at positions near said spacers.

7. A document reading apparatus according to claim 1, wherein said sheet member has a bent section extending in a direction perpendicular to the document feed path.

8. A document reading apparatus according to claim 1, wherein said sheet member is mounted to be capable of swinging on axles.

9. A document reading apparatus according to claim 1, further comprising: a first support means for supporting said sheet member and said biasing means, and a second support means for supporting said reading means, said first supporting means being arranged to be opened and closed with respect to said second support means.

10. A document reading apparatus according to claim 9, wherein said first support means can be opened and closed with respect to said second support means around an axis parallel to the document feed path.

11. A document reading apparatus comprising:

reading means having a reading section for reading documents;

a reference member opposed to the reading section of said reading means and serving to help maintain each document properly located for reading, where said reference member extends from a first location, upstream of the reading section, to a second location, downstream of the reading section, said reference member having an end portion downstream of the reading section, said end portion being movable about a center of movement which is upstream of the reading section; and a plurality of spacers for maintaining a predetermined gap between said reference member and the reading section of said reading means, said spacers being held against the reading section.

12. A document reading apparatus according to claim 11, wherein a surface of said reference member facing said reading means is white and serves as a white reference for the documents to be read.

13. A document reading apparatus according to claim 11, further comprising feeding means for feeding the documents, said reference member guiding the documents being fed by said feeding means.

14. A document reading apparatus according to claim 1 or 11, further comprising
a positioning member for positioning a document in order to read the document at a position different from the reading section for reading the documents being fed by said feeding means, wherein said spacers are provided on said positioning member.

15. A document reading apparatus comprising:
feeding means for feeding documents in a fixed direction along a document feed path;
reading means for reading the documents being fed, in a reading section;
a first guide member for guiding the documents, provided upstream of said reading means along the document feed path;
a second guide member for guiding the documents, provided downstream, along the document feed path, of said reading means, said first guide member being fixed to a surface of said second guide member facing said reading section of said reading means; and
biasing means for biasing said second guide member toward said reading section of said reading means,
said second guide member being held at a position spaced away from said reading section of said reading means by a constant distance by said biasing means.

16. A document reading apparatus according to claim 15, wherein said first guide member and said second guide member overlap above said reading section of said reading means, and wherein said first guide member is held at a position spaced apart by a fixed distance from said reading section of said reading means by said biasing means.

17. A document reading apparatus according to claim 16, wherein a surface of said first guide member facing said reading means is white and serves as a white reference for the documents to be read.

18. A document reading apparatus according to claim 15, wherein said first and second guide members are formed as flexible bodies.

19. A document reading apparatus according to claim 18, wherein said second guide member has a bent section extending perpendicularly to the document feed path.

20. A document reading apparatus according to claim 15, further comprising spacers for determining the distance between said second guide member and the reading section of said reading means.

21. A document reading apparatus according to claim 20, wherein said spacers are arranged perpendicularly to the document feed path, at either of two ends of said reading means.

22. A document reading apparatus according to claim 21, wherein said spacers are on a reading line of said reading means.

23. A document reading apparatus according to claim 20, wherein said spacers are provided on said second guide member.

24. A document reading apparatus according to claim 20, wherein said spacers are provided on said reading means.

25. A document reading apparatus according to claim 20, wherein said biasing means applies a biasing force to said second guide member at positions near said spacers.

26. A document reading apparatus according to claim 20, further comprising a positioning member for positioning a document in order to read the document at a position different from the reading section for reading the documents being fed by said feeding means, wherein said spacers are provided on said positioning member.

27. A document reading apparatus according to claim 15, wherein said guide member is mounted to be able to swing on axles.

28. A document reading apparatus according to claim 15, further comprising: a first support means for supporting said first guide member, said second guide member and said biasing means; and a second support means for supporting said reading means; said first support means being arranged to be opened and closed with respect to said second support means.

29. A document reading apparatus according to claim 28, wherein said first support means can be opened and closed with respect to said second support means around an axis parallel to the document feed path.

* * * * *